United States Patent [19]
Lasky

[11] 3,943,587
[45] Mar. 16, 1976

[54] METHOD OF MANUFACTURING THREADED NUTS AND THREADED NUT ARTICLES PRODUCED BY SUCH METHOD

[76] Inventor: Segismundo Nates Lasky, Calzada de Tlalpan 413, Mexico City 13, Mexico

[22] Filed: July 18, 1975

[21] Appl. No.: 597,387

[30] Foreign Application Priority Data
Nov. 25, 1974 Mexico .............................. 155120

[52] U.S. Cl. ................. 10/1 A; 10/86 R; 85/32 CS
[51] Int. Cl.² ..................... B21D 53/24; B21K 1/64
[58] Field of Search ..... 10/1 A, 86 R, 86 A, 86 CL; 85/32 CS; 151/14 CS

[56] References Cited
UNITED STATES PATENTS

| | | | |
|---|---|---|---|
| 1,490,123 | 4/1924 | Murray | 10/86 R |
| 1,630,958 | 5/1927 | Mauch | 85/32 CS |
| 2,079,746 | 5/1937 | Morgan | 10/86 A |
| 2,199,007 | 4/1940 | Oldham | 10/86 A |
| 2,407,879 | 9/1946 | Haas | 85/32 CS |
| 2,616,474 | 11/1952 | Healy | 10/86 A |
| 3,272,250 | 9/1966 | Hattan | 85/32 CS |

FOREIGN PATENTS OR APPLICATIONS

| | | | |
|---|---|---|---|
| 222,850 | 7/1959 | Australia | 10/86 R |
| 732,020 | 2/1943 | Germany | 85/32 CS |
| 975,912 | 10/1950 | France | 151/14 CS |

Primary Examiner—C. W. Lanham
Assistant Examiner—E. M. Combs
Attorney, Agent, or Firm—Robert E. Burns; Emmanuel J. Lobato; Bruce L. Adams

[57] ABSTRACT

A method of manufacturing threaded nuts comprises providing a hollow nut casing having the desired geometrical nut profile and having at least one radial slit extending the length of the nut casing so as to render the nut casing inwardly contractible. A coil spring insert is formed with the inner edges of the coils defining a screw thread and the coil spring insert is inserted into the hollow opening in the nut casing. Then radial pressure is applied to the hollow nut casing so as to deform and inwardly contract the nut casing so that it is compressed about the coil spring insert and while in this state, the coil spring insert is welded to the nut casing to form a unitary threaded nut. The welding can be carried out by spot welding, friction welding, electronic welding or other available welding techniques so as to integrate the coil spring insert and nut casing into a one-piece threaded nut article.

5 Claims, 11 Drawing Figures

U.S. Patent    March 16, 1976    3,943,587
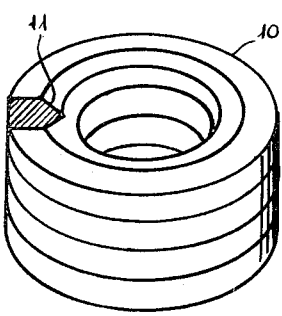
FIG. 1
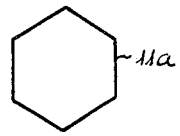
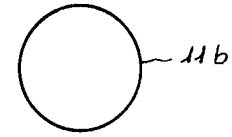
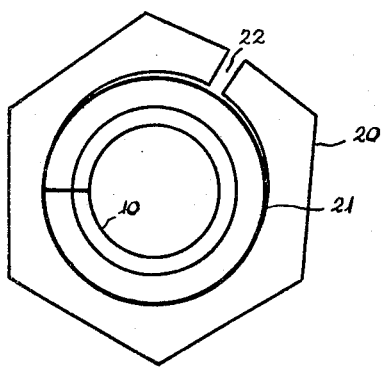
FIG. 4
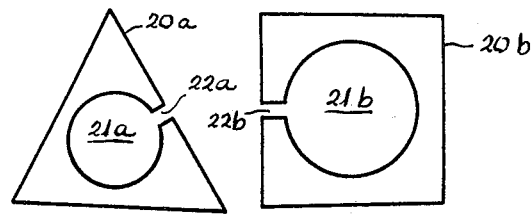
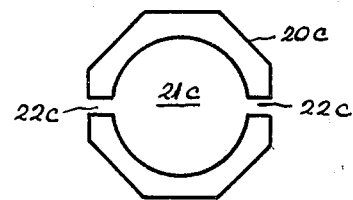
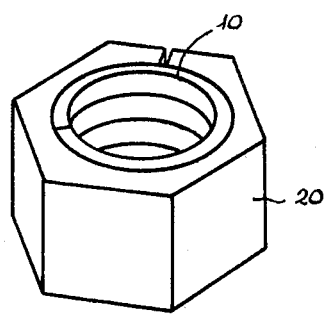
FIG. 5
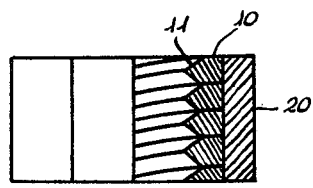
FIG. 6

METHOD OF MANUFACTURING THREADED NUTS AND THREADED NUT ARTICLES PRODUCED BY SUCH METHOD

BACKGROUND OF THE INVENTION

The present invention pertains to a method of manufacturing threaded nuts and to threaded nut articles produced by such method.

Threaded nuts are in widespread use throughout the world in virtually every field of technology and numerous techniques have been devised to produce such nuts in commercial quantities and in the various standard thread sizes. The traditional method of forming threaded nuts comprises forming on a nut forging machine nut blanks having the desired geometrical profile, such as hexagonal, square, etc., and then tapping the nut blanks to form the screw threads thereby producing threaded nuts. This technique is disadvantageous in that the material removed from the nut blanks during the tapping operation is wasted and such results in considerable material waste, especially during formation of large nuts. This prior art technique is also unsuitable for mass production due to the gradual wearing away of the screw taps which eventually results in unacceptable thread pitch tolerances. Another disadvantage is that a considerable monetary investment must be made to obtain a full set of screw taps corresponding to all of the standard thread sizes currently in use, and as the screw taps become worn through repeated use, they must be replaced and this necessitates further expense.

In order to overcome the foregoing disadvantages associated with the screw-tapping technique, it has been proposed to eliminate the tapping operation by forming the nut threads of a coil spring insert which is inserted into a preformed hollow nut casing. The interior helical edge of the coil spring insert defines the screw thread so no screw-tapping operation is necessary. However, manufacturing difficulties have been encountered in this technique and it is not heretofore been possible to satisfactorily produce threaded nuts on a commercial scale. One major difficulty resides in the manner of affixing the coil spring insert to the nut casing and the current means employed for this purpose tend to be time-consuming and somewhat intricate and hence unsuitable for mass production. For example, one proposal known in the art is to provide inturned lips on the nut casing so as to retain the coil spring insert in place, however this creates problems in forming the lips and in rigidly securing the coil spring insert to the nut casing so as to preclude relative rotation between the two. A further drawback of the currently used coil spring insert techniques is that they require some finishing operation due to the manner in which the coil spring insert is bonded to the nut casing.

SUMMARY OF THE INVENTION

The manufacturing method of the invention effectively eliminates the foregoing drawbacks and disadvantages which exist in the prior art techniques and greatly simplifies the manufacturing process. In accordance with the invention, a hollow nut casing is formed having the desired geometrical profile and having at least one radial slit extending the length of the nut casing which renders the nut casing inwardly contractible. A coil spring insert is formed with the inner edges of the coils defining a screw thread and the coil spring insert is inserted into the hollow opening in the nut casing. Then radial pressure is applied to the nut casing so as to deform and inwardly contract the nut casing so that it is compressed about the coil spring insert and while in this state, the coil spring insert is welded to the nut casing to form a unitary threaded nut. The welding can be carried out by spot welding, friction welding, electronic welding or other available welding techniques so as to integrate the coil spring insert and nut casing into a one-piece threaded nut article.

It is therefore a primary object of the present invention to provide a method of manufacturing threaded nuts which overcomes the drawbacks and disadvantages enumerated above with respect to the prior art manufacturing techniques.

Another object of the present invention is to provide a method of manufacturing threaded nuts by welding a coil spring insert to a hollow nut casing thereby eliminating any type of screw-tapping operation and minimizing wastage of material.

A further object of the present invention is to provide a method of manufacturing threaded nuts which utilizes one common apparatus for manufacturing a wide range of threaded nut articles varying in geometrical profile, thread pitch and size.

A still further object of the present invention is to provide a method of manufacturing threaded nuts which can be carried out economically and rapidly on a commercial scale.

Yet another object of the present invention is to provide a method of manufacturing threaded nuts by forming a slitted hollow nut casing, inserting a coil spring insert into the nut casing, radially compressing the nut casing about the coil spring insert while welding the two together so as to form a unitary threaded nut article.

Having in mind the above and other objects, features and advantages of the present invention that will become evident from an understanding of this disclosure, the invention comprises the manufacturing method and resultant threaded nut article as illustrated in the presently preferred embodiment of the invention which is hereinafter set forth in sufficient detail to enable those persons skilled in the art to clearly understand the function, operation and advantages of it when read in conjunction with the accompanying drawings.

BRIEF DESCRIPTION OF THE DRAWINGS

FIG. 1 is a perspective view of a coil spring insert of the type used in carrying out the method of the invention;

FIGS. 2(a)–2(b) are cross-sectional views of various coil thread profiles which can be used in accordance with the invention;

FIGS. 3(a)–3(c) are top plan views showing different nut casing geometrical profiles which can be used in accordance with the invention;

FIG. 4 is a top plan view showing the coil spring insert positioned within the nut casing but before welding of the two together;

FIG. 5 is a perspective view showing a finished threaded nut article manufactured by the method of the invention; and FIG. 6 is a side view, partly in cross-section, of the finished threaded nut article shown in FIG. 5.

DESCRIPTION OF THE PREFERRED EMBODIMENT

In accordance with the invention and with reference to FIG. 1, a coil spring insert 10 is formed in a known manner, such as by extrusion. The material for the coil spring insert comprises any suitable nut material and such materials are widely known in the art. The coil spring material may have any desired cross-section though the longitudinal inner edge of the spring material which is to form the screw thread 11 must be shaped in the form of the desired thread. For example, the spring material may have a circular cross-section as shown in FIG. 2(b) whereupon the resultant screw thread 11(b) will have a partially circular contour. The cross-sectional contours shown in FIGS. 2(a)–2(d) are representative only and other contours can be employed. For purposes of describing the present invention, the particular contour of FIG. 2(c) has been chosen as it represents one of the more standard type screw threads.

As seen in FIG. 1, the coil spring insert 10 comprises successive coils or convolutions which, when in their relaxed state, simply lie and rest upon one another. No spaces are provided between successive coils nor do the coils have specially formed portions, aside from the particular thread shape, and hence the coil spring insert 10 can be easily manufactured. One aspect of the invention resides in using a coil spring insert in which all of the coils are alike and with no spaces being provided between adjacent coils. This greatly facilitates the connection of the coil spring insert to the nut casing and helps prevent distortion of the screw pitch which may otherwise occur during the connection step.

In accordance with another aspect of the invention, a hollow nut casing 20 is formed and three exemplary nut casing configurations are shown in FIG. 3. The nut casings can be formed from an extruded tubular bar and the outer geometrical profile of the bar can be of any standard nut shape. FIGS. 3(a)–3(c) show, respectively, nut casings having a triangular, square and hexagonal profile and it is understood that other geometrical profiles may be used in carrying out the invention.

The hollow nut casing 20 of the invention is provided with an inner opening 21 and at least one radial slit 22 which extends completely through the casing and extends along the entire nut casing length. The purpose of the slit is to render the hollow nut casing 20 somewhat contractible in the sense that when radial pressure is applied on the nut casing, the casing deforms slightly and inwardly contracts to at least partially close the slit 22 thereby compressing the nut casing against the coil spring insert 10. As shown in FIG. 3(c), the nut casing itself may be composed of two or more separate pieces thereby providing a plurality of slits and this type construction is advantageous depending upon the particular welding operation by which the nut casing 20 is welded to the coil spring insert 10.

During formation of the hollow nut casings, care should be taken to account for the small degree of deformation of the nut casing which occurs during welding. Hence the nut casing itself should be formed in a slightly expanded state so that during contraction and inward deformation thereof, the nut casing will end up at the correct size. As the amount of deformation of the nut casing is so small, the slight expanded state of the nut casings is hardly noticeable in FIGS. 3 and 4.

Another step of the manufacturing method of the invention resides in inserting the coil spring insert 10 into the opening 21 of the nut casing 20 and FIG. 4 shown in this stage of manufacture. It is noted that at this stage, the hollow nut casing 20 has not yet been deformed so that the interior opening 21 has its maximum size thereby facilitating insertion of the coil spring insert 10 into the opening. It is also noted that in accordance with another feature of the invention, the exterior surface of the coil spring insert 10 need not be smoothly finished nor otherwise surface-treated and minor irregularities in the exterior surface of the insert will not affect production of the threaded nut.

After positioning the coil spring insert 10 into the nut casing opening 21, pressure is applied in a radial inward direction about the nut casing 20 so as to contract and slightly deform the nut casing so that it is tightly compressed about the coil spring insert 10. While the nut casing is pressed tightly about the coil spring insert, the two are welded together so as to form a unitary, one-piece threaded nut article as shown in FIGS. 5 and 6.

In carrying out the compressive deformation of the hollow nut casing and the subsequent welding, one type of apparatus which can be used is a standard friction welding apparatus. The details of such an apparatus are well known in the art and by way of further explanation, the precise manner in which the threaded nut is formed will be described with reference to a friction welding apparatus. The hollow nut casing 20 is placed on a rotary chuck having movable jaws which can be movably positioned by pneumatic pressure on the like. The coil spring insert 10 is threaded onto a slidable support shaft which is then slid so as to position the coil spring insert 10 within the opening 21 of the nut casing 20. The condition of the hollow nut casing 20 and coil spring insert 10 at this stage of the operation is as shown in FIG. 4. The chuck is then rotated so as to rotate the nut casing 20 and then the chuck jaws are actuated so as to exert radial inward pressure on the nut casing 20 thereby deforming the same tightly about the stationary coil spring insert 10. The pressure exerted by the chuck jaws creates the necessary frictional heat and pressure to weld both parts together after which the support shaft immediately begins rotating due to the release of a spring clutch. The weldment now comprises one metal article and the welded section has one grain structure throughout. The screw pitch is preserved because the support shaft is threaded onto the threads of the coils spring insert and prevents deformation thereof and after stopping of the friction welding apparatus, the threaded nut article is simply unscrewed from the support shaft. Alternatively, the parts can be reversed and the nut casing 20 can be held on the support shaft and the coil spring insert 10 can be rotationally driven by the rotary chuck.

Though the invention has been described with respect to friction welding, other types of welding can also be used. Thus magnetic flux welding, projection welding, spot welding, electronic welding and other welding techniques can be used to weld the nut casing to the coil spring insert and in each case, a suitable chuck holds the hollow nut casing 20 and inwardly deforms and contracts the same about the coil spring insert 10 during the welding step. After the nut casing 20 and coil spring insert 10 are welded together, any remaining portion of the slit which has not been closed can be filled with weld material. Also, in spot welding, the slit 22 can serve as a weld site for welding the nut casing and spring insert together.

An important feature of the invention resides in the fact that the coil spring insert 10 need not be compressed nor otherwise subjected to any special treatment during its welding to the nut casing. The coil spring insert 10 is maintained in its relaxed or normal state and this greatly facilitates and simplifies the welding step.

While the invention has been disclosed and described with reference to one preferred embodiment, it is understood that many modifications thereof and changes thereto will become apparent to those ordinarily skilled in the art and the present invention is intended to cover all such obvious modifications and changes which fall within the spirit and scope of the invention defined in the appended claims.

I claim:

1. A method of manufacturing a threaded nut article comprising the steps of:
   providing a coil spring insert having a plurality of connected together coils the inner edges of which defines a screw thread;
   providing a hollow nut casing having an outer profile in the shape of a nut, an inner opening extending through said nut casing and dimensioned to receive therein said coil spring insert, and at least one radial slit extending the length of said nut casing effective to render said nut casing slightly deformable and inwardly contractible when radial inward pressure is applied thereto;
   positioning said coil spring insert into the nut casing inner opening;
   applying sufficient radial inward pressure to said nut casing to slightly deform and inwardly contract the same so as to compress it about said coil spring insert; and
   connecting said nut casing and coil spring insert together during the application of said radial inward pressure to form a unitary threaded nut article.

2. A method according to claim 1; wherein said connecting step comprises welding said nut casing and coil spring insert together.

3. A method according to claim 1; wherein said connecting step comprises spot welding said nut casing and coil spring insert together by applying weld material at the site of said radial slit.

4. A method according to claim 1; wherein said steps of applying radial pressure and connecting together said nut casing and coil spring insert are carried out simultaneously by a friction welding operation.

5. A threaded nut article manufactured according to the method of claim 1.

* * * * *